W. SOBEY.
GANG PLOW.
APPLICATION FILED MAY 25, 1911.

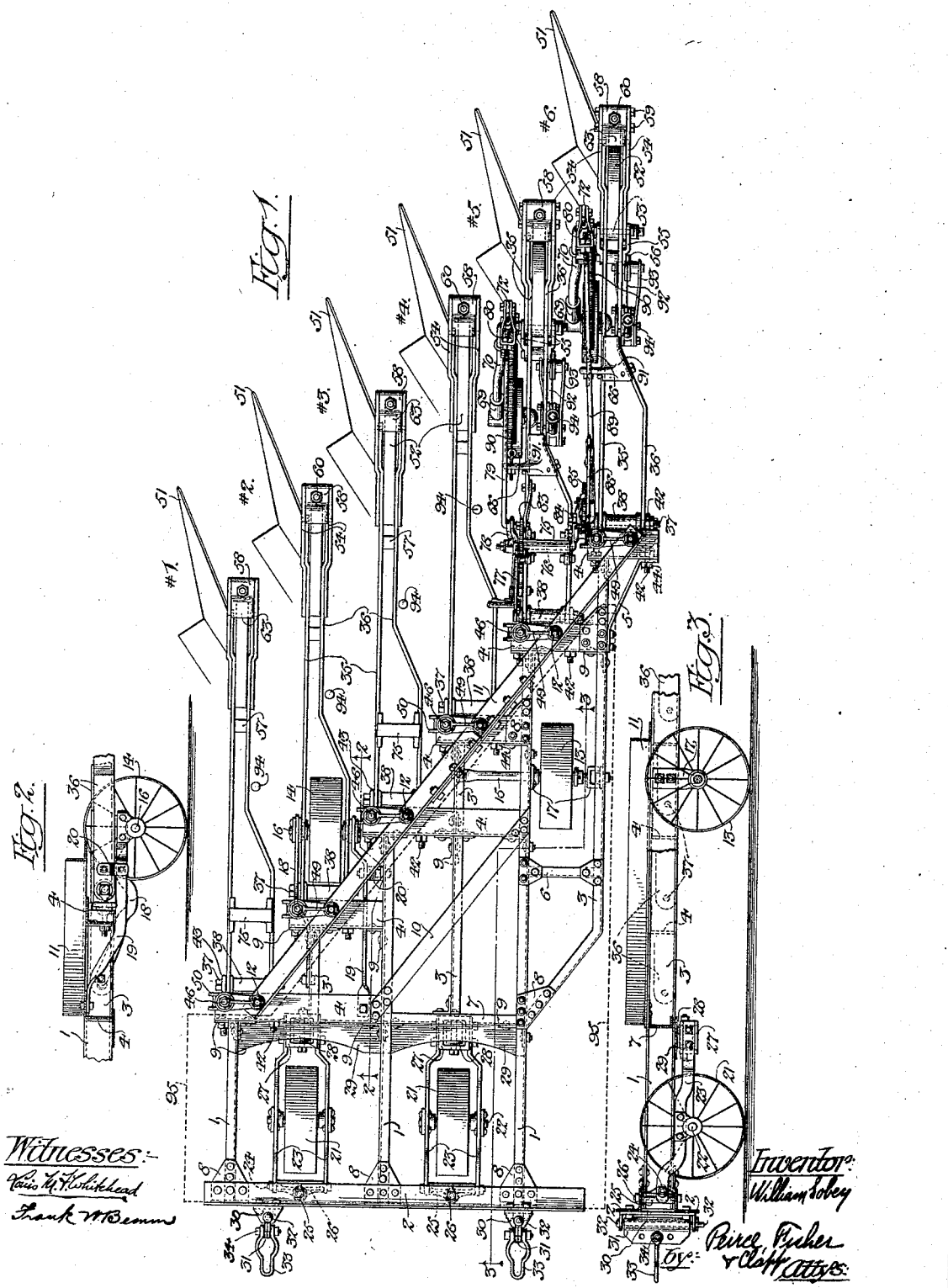

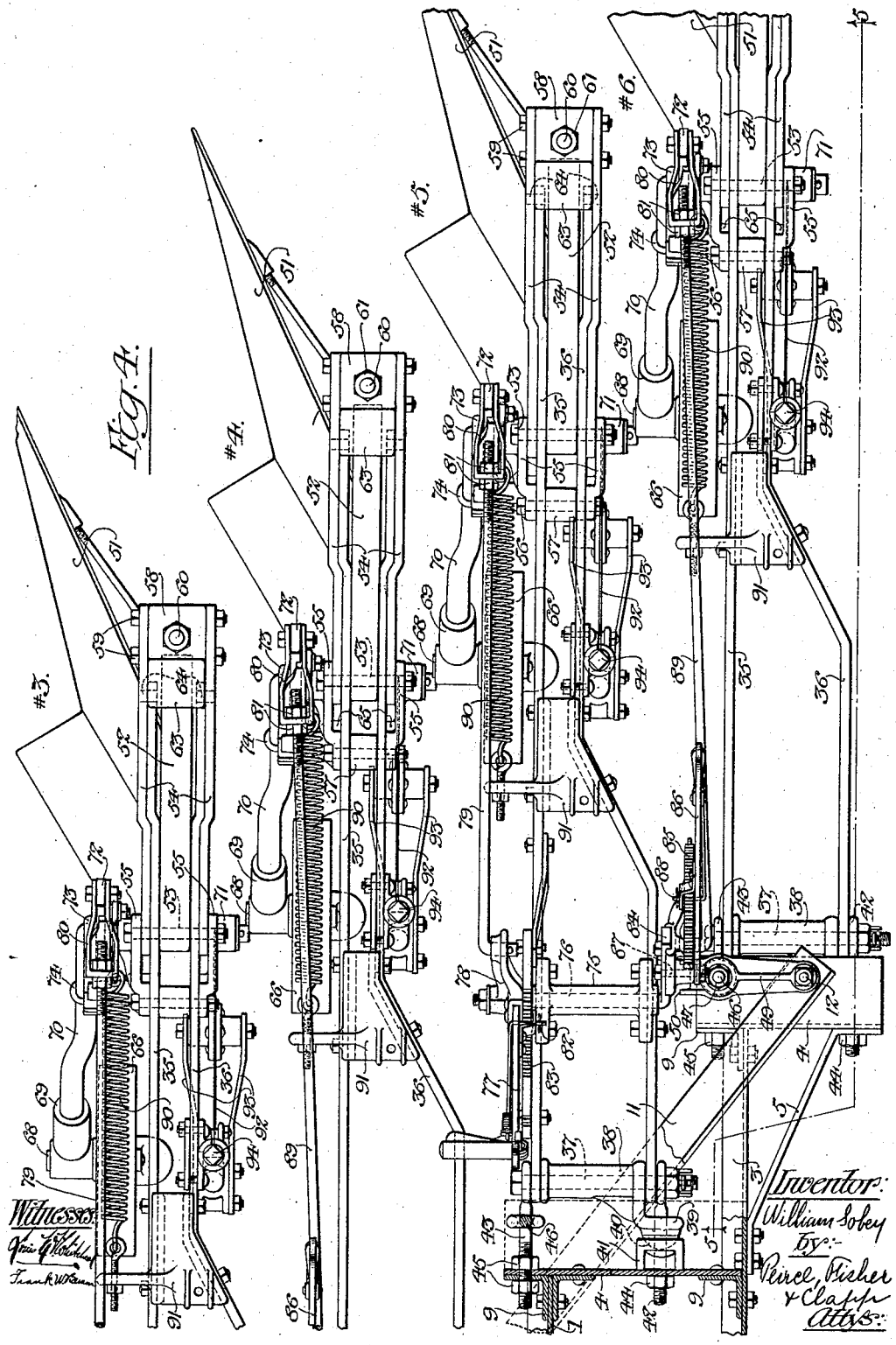

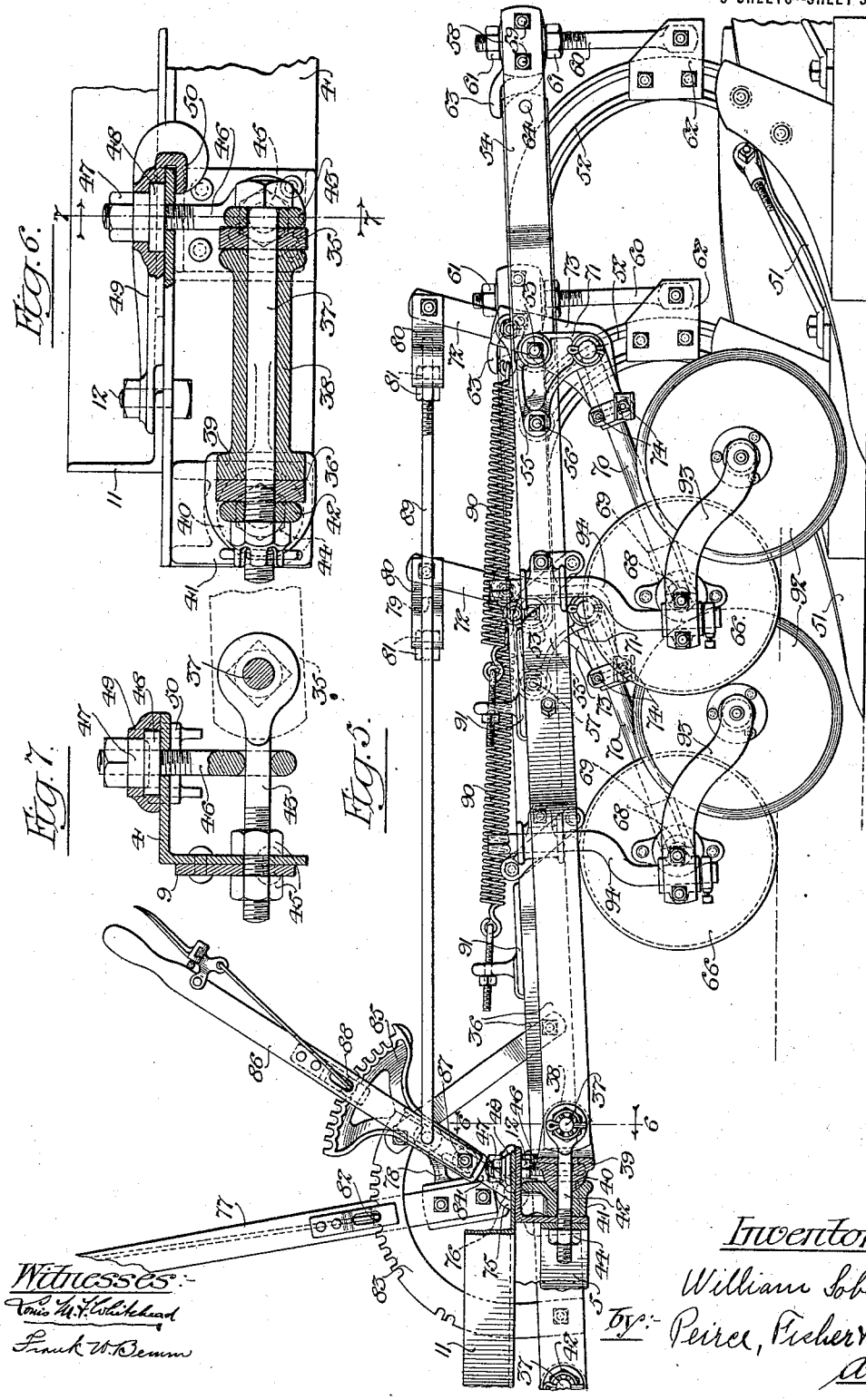

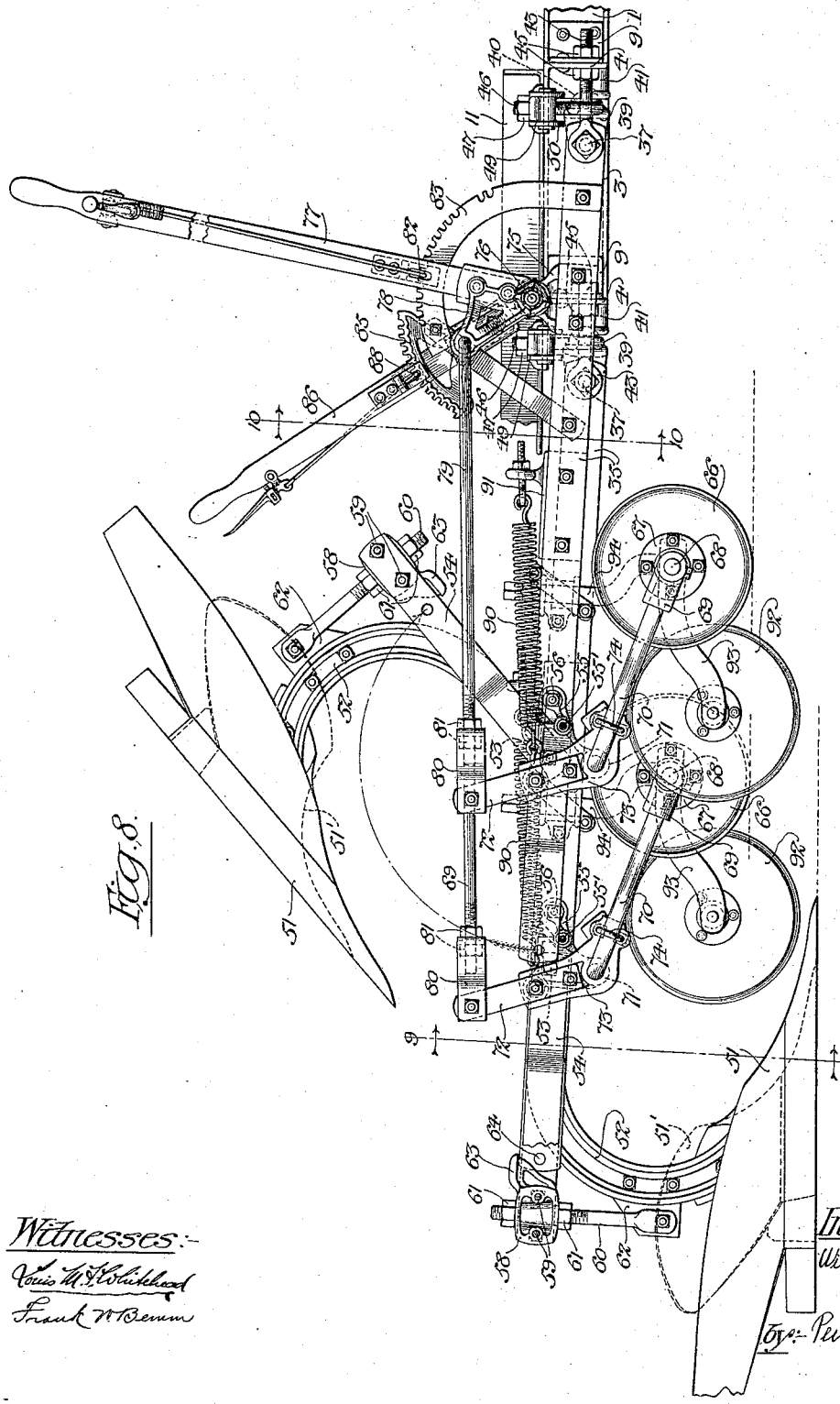

1,185,257.

Patented May 30, 1916.
5 SHEETS—SHEET 5.

Witnesses:—

Inventor:—
William Sobey
By:— Peirce, Fisher & Clapp
Attys.

UNITED STATES PATENT OFFICE.

WILLIAM SOBEY, OF RACINE, WISCONSIN, ASSIGNOR TO J. I. CASE PLOW WORKS, OF RACINE, WISCONSIN, A CORPORATION.

GANG-PLOW.

1,185,257.  Specification of Letters Patent.  Patented May 30, 1916.

Application filed May 25, 1911. Serial No. 629,269.

*To all whom it may concern:*

Be it known that I, WILLIAM SOBEY, a citizen of the United States, and a resident of Racine, Racine county, Wisconsin, have invented certain new and useful Improvements in Gang-Plows, of which the following is a full, clear, and exact description.

The invention seeks to provide an improved plow for use with traction engines having an improved form of mechanism for raising and lowering the plows and regulating their working depths, which will permit an independent movement of the plows or plow units and which reduces the number of operating levers necessary to raise and lower the plows.

The invention consists in the features of improvement hereinafter set forth, illustrated in the accompanying drawings and more particularly pointed out in the appended claims.

Figure 9:
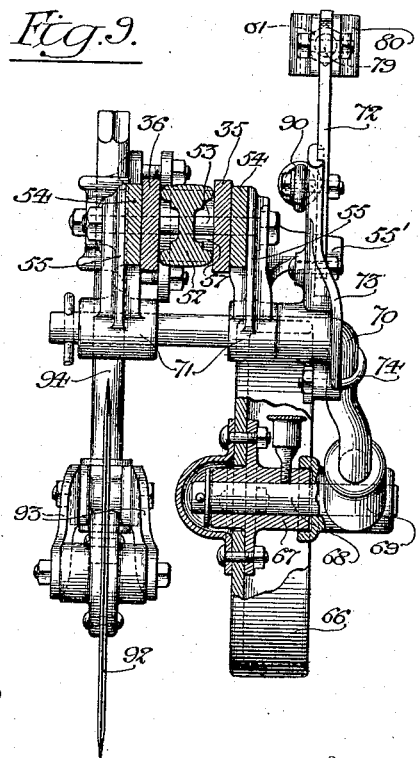
Figure 10:
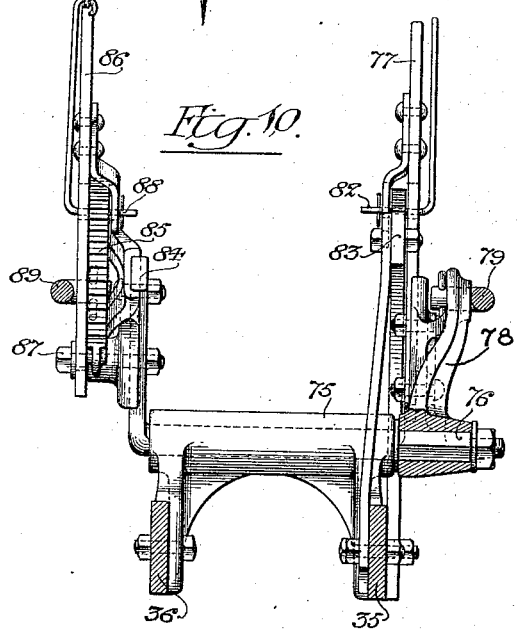

In the drawings, Figure 1 is a plan view of the improved traction or gang plow. Figs. 2 and 3 are vertical sections of the draft frame on the lines 2—2 and 3—3 respectively of Fig. 1. Fig. 4 is a plan view of some of the plows illustrating the construction of the plow beams, the lift mechanism and the manner of connecting the plow beams to the draft frame. Fig. 5 is a view in elevation of two of the plows with parts shown in section on the line 5—5 of Fig. 4. Fig. 6 is a detail section on line 6—6 of Fig. 5. Fig. 7 is a detail section on the line 7—7 of Fig. 6. Fig. 8 is a view in elevation of two of the plows looking from the right-hand side of the plow structure. Fig. 9 is a detail vertical section on the line 9—9 of Fig. 8 and Fig. 10 is a detail vertical section on the line 10—10 of Fig. 8.

The drawings illustrate a gang or traction plow having six plow bodies, but it will be understood that a greater or less number of plow bodies can be employed. The draft frame of the improved plowing structure is substantially triangular in section and comprises a series of longitudinal frame bars connected at their front and rear ends by suitable transverse bars. Preferably, there is one of these longitudinal bars for each plow body and these bars are preferably formed of channel irons. In the form shown, three of these longitudinal frame bars 1 are connected at their forward ends by two upper and lower, transverse angle bars 2. A second series of longitudinal frame bars 3 are alternately arranged with respect to the longitudinal bars 1 and terminate short of the forward ends thereof. The rear ends of the longitudinal bars 1 and 3 terminate progressively at different distances from the front transverse bars 2 and are connected to a series of short transverse bars 4 which are preferably formed of heavy angle iron. These short transverse angle bars 4 form an inclined series of steps at the rear portion of the draft frame and each has an upper horizontal flange and a vertical depending flange, as most clearly shown in Figs. 4, 5, 6 and 7. Each of these step angle bars 4 is connected to and extends across the rear end of one of the longitudinal bars 1 or 3. The first step bar 4 is connected to the first two longitudinal bars 1 and to the forward end of the intermediate longitudinal bar 3. Each of the other step angle bars, except the last one of the series, is connected to and extends across the end of one of the longitudinal bars and is also connected to the side of another longitudinal bar. The last step bar 4 is connected to the outside longitudinal bar 3 by an inclined brace bar 5. The forward end of this outside bar 3 is bent inwardly and connected to the adjacent bar 1. It is also connected to this bar by a transverse brace 6. The left-hand outside bar 1 and the center bar 1 are connected in line with the first step bar 4 by a transverse channel bar 7 which is also connected to the forward end of the intermediate longitudinal bar 3. The joints between the several bars are braced by fillet plates 8 and by angle clips 9. A short inclined brace bar 10 connects the two left hand longitudinal bars 1 and a long inclined brace bar 11 extends over the horizontal flanges of the step bars 4 and is connected thereto by a series of bolts 12.

The rear portion of the draft frame is supported on wheels 13 and 14 mounted on shafts 15 and 16. The shaft 15 is carried by a series of brackets 17 that depend from the three left-hand longitudinal bars of the frame. The shaft 16 is mounted in the rear ends of a pair of drag bars 18 and 19 which are bent around the connection between the frame and the second plow of the gang or series (see Figs. 1 and 2). The forward end of the bar 18 is connected to the first longitudinal frame bar 3 and the forward end of the bar 19 is connected to the horizontal flange of the first step bar 4. This bar 19 is also connected to the central longitudinal bar 1 by a depending strip 20.

The forward portion of the draft frame is mounted upon two caster wheels 21 of similar construction. These caster wheels are carried upon shafts or axles 22, each of which is connected at its ends to a pair of bars 23. The forward ends of these bars are connected by a horizontal pivot bolt 24 (see Figs. 1 and 3) to a bracket 25 which is arranged between the front transverse bars 2 and is centrally pivoted thereto by a vertical pivot bolt 26. The rear ends of each pair of bars are bent inwardly and a frame 27 connected thereto carries a roller 28 having a horizontal longitudinal axis and engaging a portion of the draft frame. In the preferred construction shown, the caster wheels 21 are arranged between the forward ends of the long longitudinal bars 1 and the rollers 28 engage transverse plates 29 secured to these bars below the transverse brace bar 7 and the first transverse step bar 4. The caster wheels swing upon the vertical pivot bolts 26 to facilitate the turning of the traction frame. The caster wheels can also swing vertically upon the horizontal pivots 24 so that they always remain in contact with the ground and no strain is brought upon the connections between the frame and caster wheels when the frame tilts in passing over uneven ground.

Two or more vertical U-shaped clips 30 are adjustably bolted to the front faces of the vertical flanges of the front draft bars 2 and carry clevises each comprising a part 31 connected to the clip 30 by a vertical pivot bolt 32 and a link 33 adjustably and pivotally connected to the part 31 by a horizontal bolt 34.

The plows of the gang are arranged in an inclined series and the beams thereof are connected at their forward ends to the step bars 4 of the traction frame in line with the longitudinal frame bars 1 and 3. The beam of each plow, in accordance with the preferred embodiment of the invention, comprises two main bars 35 and 36 which are spaced at their rear ends and somewhat farther apart at their forward ends. In the arrangement shown, the bar 36 is offset intermediate its ends. The connections between the pairs of beam bars 35 and 36 and the transverse step bars 4 of the draft frame are all alike. Each comprises a substantially horizontal pivot bolt arranged transversely to the line of draft and means for swinging the pivot bolt in a vertical plane to tilt the beam bars and plow bodies connected thereto. Means are also provided for swinging the pivot bolt horizontally in the direction of the line of draft, so that the different plows may be properly and uniformly spaced from one another.

In the preferred embodiment of the invention illustrated, a transverse pivot bolt 37 (see Figs. 4, 5, 6 and 7) extends through the forward ends of the pair of beam bars 35 and 36. A sleeve 38 hung or pivotally mounted upon the bolt 37 between the beam bars, has a swinging or ball and socket connection with the frame at one end. As shown, the sleeve is provided with a forwardly and laterally projecting arm 39 terminating in a semi-spherical head or ball 40. This ball sets within a socket formed in a member 41 which is arranged within the angle of the step bar 4 and abuts against the vertical and horizontal flanges thereof. A pair of eye-bolts 42 and 43 engage the ends of the pivot bolt 37 outside of the beam bars 35 and 36 and extend forwardly therefrom through the vertical flange of the step bar 4. The left-hand eye-bolt 42 extends through openings formed in the ball and socket members 40 and 41 and a nut 44 threaded on the forward end of the bolt engages the front face of the step bar. This bolt holds the ball and socket members in engagement and in the position shown with the broad flat upper portion of the socket member 41 engaging the horizontal flange of the step bar 4 so that it cannot turn. The bolt 43 extends through the right-hand end of the step bar 4 which projects beyond the end of one of the longitudinal frame bars to which it is connected. The bolt also extends through one of the strengthening clips 9. Set nuts 45 threaded on the bolt 43 on opposite sides of the vertical flange of the step bar serve to adjust the bolt to swing the right-hand end of the pivot bolt horizontally in the direction of the line of draft. By this means the beam bars can be shifted laterally to uniformly space the plow bodies.

An eye-bolt 46 engages the rear end of the eye-bolt 43 and extends upwardly and vertically through the horizontal flange of the step bar 4. At its upper end the bolt is provided with an adjusting nut which rests on the horizontal flange of the bar 4 and which is provided at its lower portion with an annular rib or shoulder 48. The lower portion of the adjusting nut 47 is rotatably mounted within a recess formed in a clip 49 secured to the upper face of the step bar 4 to thereby hold the nut 47, bolt 46 and the parts connected thereto against vertical movement. In the form shown, this clip is provided with a hook 50 which engages the end of the step bar 4. The opposite end of each clip overlaps the horizontal flange of the inclined brace bar 11 and is held in position by one of the bolts 12 which fasten the inclined brace bar to the step bars 4. By this arrangement, the vertical adjusting bolt 46 and the parts connected thereto are normally held against vertical movement, but by rotating the nut 47 the pivot bolt 37 can be swung in vertical direction to tilt the pair of beam bars and plow bodies connected thereto, and the plow bottom can thus be adjusted to properly perform its work. In effecting the horizontal and vertical adjustments of the pivot bolt 37, it is understood that the nuts 44 and 45 on the horizontal eye-bolt 42 and 43 are first loosened and when the desired adjustment is effected, these nuts are tightened to securely hold the pivot bolt 37 and the pair of beam bars 35 and 36 connected thereto in position. It is of course understood that the pair of beam bars 35 and 36 are then free to swing vertically upon the pivot bolt 37, but they are held against improper movement laterally or about an axis extending in the direction of the line of draft.

Each plow body 51 is connected to a standard 52 which extends upwardly and forwardly between the rear ends of the pair of main beam bars 35 and 36 and which standard is preferably curved, as shown. The forward end of the standard 52 is pivotally connected to the beam bars, at a point in front of the rear ends thereof, by a through bolt 53 (see Figs. 4, 5 and 9).

Each plow is provided with a supplemental beam which preferably comprises a pair of supplemental bars 54 which are arranged outside of the rear ends of the main bars and are pivotally connected thereto at their forward ends, preferably by the pivot bolt 53. This bolt thus pivotally connects the standard 52 and the main and supplemental pairs of beam bars. It also extends through the rear portions of a pair of cast metal brackets 55 which abut against the outer faces of the beam bars 35 and 36 and are connected thereto at their forward ends by a through bolt 56. This bolt extends through a filler block 57 arranged between the main beam bars 35 and 36. The rear portions of the brackets 55 overlap the forward ends of the supplemental beam bars or arms 54, as most clearly shown in Fig. 4.

The pair of supplemental beam bars 54 extend beyond the rear ends of the main beam bars and are adjustably connected to the rear end of the standard 52. In the preferred form illustrated, a cast metal block 58 is secured between the rear ends of the supplemental arms 54 by a pair of transverse bolts 59. A link or bolt 60 extends vertically through the block 58 and is connected thereto by a pair of set nuts 61. The lower end of the bolt is pivotally connected to a rearwardly projecting bracket 62 on the lower rear portion of the standard 52. The block 58 is provided with a forwardly projecting stop or lug 63 which normally rests upon the rear ends of the pair of main beam bars 35 and 36 and the main and supplemental beam bars are connected in rear of the pivot bolt 53 preferably by means of wooden break pins 64, which extend through registering holes in the rear ends thereof. By adjusting the nuts 61 on the bolt 60 the standard 52 and plow body mounted thereon can be tilted in a vertical direction and the plow presented at such an angle that it will be properly forced into the ground by the forward movement of the plowing structure. By removing the break pins 64 the supplemental beam bars 54, standard 52 and plow body 51 can be swung upwardly and forwardly past a vertical dead center position and into the position shown in Fig. 8. The parts are supported in this position by stop shoulders 65 on the brackets 55 (see Fig. 4) which engage and arrest the forward swing of the supplemental beam bars 54. In this position of the parts, the plow bodies can be readily interchanged, as desired, for work of different kinds. In Fig. 8 breaker plow bodies are shown in full lines and stubble plow bodies 51' in dotted lines. When the plow bodies are swung back to normal position, the stop lug 63 again engages the ends of the main beam bars 35 and 36 and the rear ends of the main and supplemental beam bars are then connected by wooden pins 64. These pins will break if the plow body strikes an unyielding obstruction, so that the plow body and parts connected thereto can be thrown up without injury to any of the metal parts of the plow or of its lifting mechanism.

Suitable means are provided for lifting the plows and regulating the working depths thereof which are so arranged that each plow is free to rise and fall as it passes over the ground, independently of the other plows and which are also so arranged that two plows can be raised and lowered by a single main shift lever.

Each plow is provided with a depth regulating gage wheel 66 which is rotatably mounted upon the lower end of a suitable standard. This standard is movably connected to the plow beam and is preferably pivoted thereto intermediate its ends and the shift mechanism for raising and lowering the plow and for regulating the working depth thereof, is connected to the upper end of the standard. In the construction shown, the gage wheel is provided with a hub 67 which rotatably engages a short horizontal shaft 68. A casting 69 fixed to the end of the shaft is secured to the lower end of a wrought metal standard section 70. The upper end of this portion of the standard is bent laterally and is journaled or horizontally pivoted in lugs 71 which depend from the brackets 55. The standard 70 is provided with an upwardly projecting extension in the form of an arm 72 which is preferably firmly secured thereto by a casting 73 which has a seat for receiving the arm or standard extension and to which the arm is bolted, and which also extends around the horizontal or pivotal portion of the standard, being connected to the depending portion thereof by a U-bolt 74.

The shift levers for each pair of plows are mounted upon one of the pair of plows adjacent its forward end. For this purpose each alternate plow is provided near its forward end with a bracket 75 which extends between and is fixed to the beam bars 35 and 36 and which is provided with a sleeve portion for receiving a rock shaft 76. The main shift lever 77 is secured to the right-hand end of the rock shaft by a cast metal bracket 78 and a rigid link 79 extends between a lug on the bracket 78 and the upper end of the gage wheel standard of the plow whereon the lever is mounted. The rear end of the link 79 is preferably connected to the upper end of the standard arm 72 by an adjustable connection comprising a loop 80 through which the rear end of the link extends and a pair of set nuts 81 threaded on the link and adjustably connecting it to the loop 80. A dog 82 on the main shift lever 77 is arranged to engage a notched segment 83 secured to the beam bar 35 and thereby hold the shift lever and the gage wheel connected thereto in adjusted position. The rock shaft 76 is provided on its opposite end with an arm 84 to which is fixed a notched segment 85. A supplemental depth regulating lever 86 is connected at its lower end by a pivot bolt 87 to the notched segment 85 and arm 84 and is adjustably secured to the segment and arm by a suitable dog 88. A link 89 secured to the supplemental depth regulating lever 86 is connected to the upper end of the standard of the gage wheel of the next adjacent plow and preferably by a U-shaped loop 80 and adjusting nuts 81. The gage wheels of the two adjacent plows are thus both connected to the common rock shaft 76 and by operating the main lever 77 to shift this rock shaft, the gage wheels 66 of the pair of plows can be swung forwardly and backwardly to raise and lower the plows and also regulate the working depth thereof. The supplemental depth regulating lever 86 which is adjustably connected to the main shift lever 77 can be shifted independently thereof to independently adjust the working depth of the second plow of the pair. In this way the number of levers necessary to raise and lower the plows is reduced, but at the same time it is possible to independently adjust the working depth of each plow. To facilitate the operation of the shift levers, each plow is preferably provided with a lift spring 90 extending forwardly from the arm 72 on the gage wheel standard to a bracket 91 fixed to the beam bars 35 and 36.

It should be noted that the main and supplemental shift levers which are connected by rigid links to the upper end of the gage wheel standards are mounted adjacent the forward ends of the plow beams or adjacent the pivotal connections of the plow beams with the draft frame. By reason of this arrangement each plow is free to rise and fall independently of the other plows as it passes over irregularities of the ground, even though the shift levers are locked against movement about their pivots and even though the same main lever is used for raising and lowering a pair of adjacent plows.

A projecting lug 55' (see Figs. 8 and 9) on the bracket 55 is arranged to engage the part 73 on the gage wheel standard and prevents overthrow of the gage wheel or accidental displacement thereof in case the shift levers or the connections are disarranged.

Each plow is provided with an ordinary revolving colter wheel 92 which is journaled between the rear ends of a pair of arms 93. The forward ends of these arms are pivotally mounted on the lower end of a standard 94 and the upper portion of the standard is suitably secured to the beam bar 36. In Fig. 1 of the drawings the details of the lift mechanism of the first four plows are omitted, but it will be understood that the lift mechanism for the several pairs of plows are alike. A platform of wood or the like is placed upon the draft frame, as indicated in dotted lines at 95 in Fig. 1, and the attendant who operates the plow lifting mechanism stands on this platform.

It is obvious that numerous changes may be made in the details set forth without departure from the essentials of the invention as defined in the claims.

I claim as my invention:—

1. In a gang plow, the combination with a draft frame and a number of trailing plows having beams pivotally connected at their forward ends to said frame, of a lift mechanism for each pair of adjacent plows comprising a main shift lever directly connected to one of the pair of plows to raise and lower the same and regulate its working depth, a rock shaft whereon said main lever is fixed, a segment fixed to said rock shaft, a pivoted supplemental lever adjustably connected to said segment, and connections between said supplemental lever and the other plow of the pair.

2. In a gang plow, the combination with a draft frame and a number of plows connected to said frame, of gage wheels shiftably connected to said plows, and a lift mechanism for each pair of adjacent plows comprising main and supplemental levers connected respectively to the gage wheels of the pair of plows, said supplemental lever being adjustably connected to said main lever.

3. In a gang plow, the combination with a draft frame and a number of trailing plows having beams pivotally connected at their forward ends to said frame, of a lift mechanism for each pair of adjacent plows comprising adjustably connected main and supplemental levers, said levers being pivotally mounted adjacent the forward ends of beams of the pair of plows, and connections rearwardly extending from said levers to the separate plows of the pair.

4. In a gang plow, the combination with a draft frame and a number of trailing plows having beams pivotally connected at their forward ends to said frame, of gage wheels movably connected to the beams of said plows, and a lift mechanism for each pair of adjacent plows comprising a rock shaft arranged adjacent the pivotal connections between the pair of plows and said frame, a main shift lever fixed to said rock shaft, a supplemental depth regulating lever adjustably connected thereto, and links connecting said main and supplemental levers respectively to the gage wheels of the pair of plows.

5. In a gang plow, the combination with a draft frame and a number of trailing plows having beams pivotally connected at their forward ends to said frame, of gage wheels movably mounted on the beams of said plows, and a lift mechanism for each pair of adjacent plows comprising a main lever pivotally mounted upon the forward end of one of the plow beams, a supplemental lever adjustably connected to said main lever and rigid links connected to said main and supplemental levers respectively to the gage wheels of the pair of plows.

6. In a gang plow, the combination with a draft frame and a number of trailing plows having beams pivotally connected at their forward ends to said frame, of gage wheels for said plows, standards for said gage wheels pivotally connected between their ends to said plow beams, and a lift mechanism for each pair of adjacent plows comprising a rock shaft journaled on the forward end of the beam of one of said plows, a main shift lever fixed to one end of said shaft, a notched segment fixed to its opposite end, a supplemental lever adjustably connected to said segment, and rigid links connected to said levers and to the upper ends of the gage wheel standards respectively of the pair of plows.

7. In a gang plow, the combination with a draft frame, and a number of plows having beams pivotally connected at their forward ends to said frame, of a lift mechanism for a pair of said plows comprising a rock shaft connected to one of the pair of plows to raise and lower the same and regulate its working depth, a main shift lever and a segment fixed to said rock shaft, a supplemental lever adjustably connected to said segment and connections between said supplemental lever and the other plow of the pair.

8. In a gang plow, the combination with a draft frame and a number of trailing plows having beams pivotally connected at their forward ends to said frame, of gage wheels movably connected to the beams of said plows, and a lift mechanism for each pair of adjacent plows comprising a rock shaft arranged adjacent the pivotal connection between the pair of plows and said frame, a link connecting said rock shaft to the gage wheel of one of said plows, a main shift lever fixed to said rock shaft, a supplemental depth regulating lever adjustably connected thereto, and a link connecting said supplemental lever to the gage wheel of the other plow of the pair.

9. In a gang plow, the combination with a draft frame and a number of trailing plows having beams pivotally connected at their forward ends to said frame, of gage wheels for said plows, standards therefor pivotally connected to the beams of said plows intermediate their ends, and a lift mechanism for each pair of adjacent plows comprising a rock shaft journaled on the forward end of the beam of one of the pair of plows, a main shift lever and a notched segment fixed to said rock shaft, a supplemental lever adjustably connected to said segment and rigid links connecting said supplemental lever and said rock shaft to the upper ends of the gage wheel standards respectively of the pair of plows.

10. In a gang plow, the combination with a draft frame and a number of trailing plows having beams pivotally connected at their forward ends to said frame, of gage wheels movably mounted on the beams of said plows, and a lift mechanism for a pair of said plows comprising a main lever pivotally mounted on the forward end of one of said plows, a supplemental lever adjustably connected to said main lever and connecting links between said main and supplemental levers and the gage wheels of the pair of plows.

11. In a gang plow, the combination with a draft frame and a number of trailing plows having beams pivotally connected at their forward ends to said frame, of a lift mechanism for a pair of said plows comprising adjustably connected main and supplemental levers, said levers being pivotally mounted adjacent the forward ends of the beams of the pair of plows, and connections extending from said levers to the separate plows of the pair.

WILLIAM SOBEY.

Witnesses:
 ROY WINFIELD MARTIN,
 HERMAN CHARLES GROENKE.